H. T. WOOLSON.
HYDROCARBON MOTOR.
APPLICATION FILED FEB. 21, 1916.

1,321,871.

Patented Nov. 18, 1919.

Witness:
Clair J. Cote,

Inventor:
Harry T. Woolson,
By Milton Tibbetts
Attorney.

UNITED STATES PATENT OFFICE.

HARRY T. WOOLSON, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,321,871.        Specification of Letters Patent.     Patented Nov. 18, 1919.

Application filed February 21, 1916. Serial No. 79,723.

*To all whom it may concern:*

Be it known that I, HARRY T. WOOLSON, a citizen of the United States, and resident of Detroit, Wayne county, State of Michigan, have invented certain new and useful Improvements in Hydrocarbon-Motors, of which the following is a specification.

This invention relates to hydrocarbon motors, and particularly to the water circulation system thereof.

One of the objects of the invention is to provide a valve device to automatically control the circulation of water between the jackets of a hydrocarbon motor and the radiator. As shown the valve device comprises a casing with inlet and outlet ports, a valve for controlling the ports and a thermostat connected to operate the valve.

Other objects of the invention will appear from the following description, taken with the drawings which form a part of this specification, and in which:—

Figure 1:
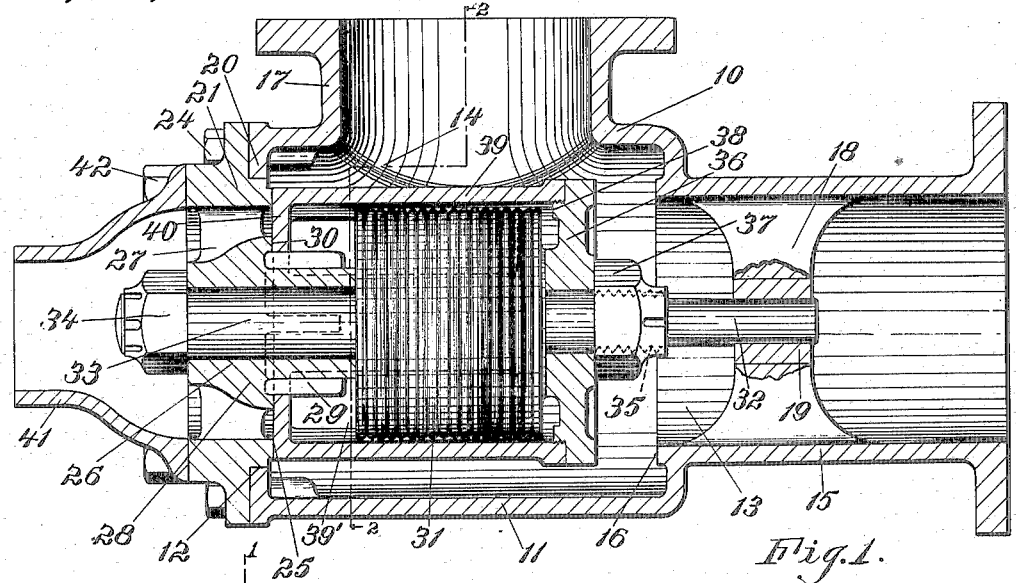
Figure 1 is a longitudinal section on the line 1—1 of Fig. 2.
Figure 2:
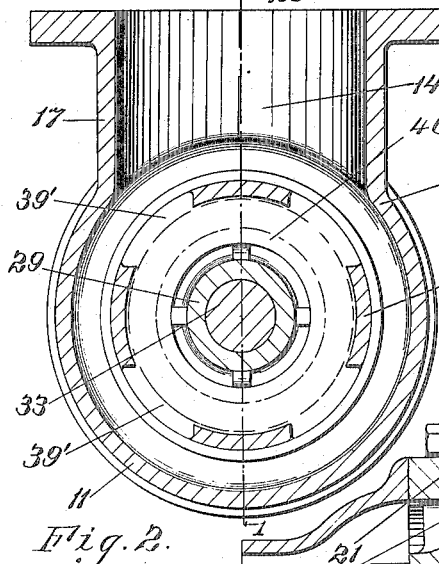
Fig. 2 is a vertical transverse section substantially on the line 2—2 of Fig. 1.

Referring to the drawings, 10 is a valve casing of substantially inverted T-shape comprising a chamber 11 having port openings 12 and 13 at the ends thereof respectively and an opening 14 intermediate the end openings.

The chamber 11 has a cylindrical member 15 formed integral therewith and projecting outwardly from the opening 13, the inner end thereof forming a valve seat 16.

A similar member 17 extends from the opening 14. The member 15 has webs 18 formed interiorly thereof which support a centrally disposed bearing 19 for the purpose hereinafter described.

The opening 12 of the chamber 11 is provided with an inwardly extending flange 20 to which a hollow cover 21 is secured in any convenient manner as by the bolts 24, the inner end thereof forming a valve seat 25 which faces oppositely and is arranged parallel to the valve seat 16 above described.

The cover 21 is provided with a centrally disposed boss or member 26 supported by webs 27, said member comprising an enlarged portion 28 and a reduced fluted portion 29 projecting into the chamber 11. The inner face of the portion 28 forms a valve seat 30 in the plane of the valve seat 25.

A thermostatic unit 31 of any suitable construction is supported in the valve chamber by stems 32 and 33 which project from the ends thereof respectively and are journaled in the bearing 19 and member 26 respectively.

The outer end of the stem 33 is threaded and is provided with a nut 34 which holds it securely in the member 26.

The stem 32 is slidably arranged in the bearing 19 and is enlarged throughout a portion of its length adjacent the thermostat, the outer end of the enlarged portion being provided with threads, 35. A valve plate 36 fits over the enlarged portion of the stem 32 and is held securely against the thermostatic unit by a lock nut 37 which fits the threads 35.

The inner face of the valve plate 36 is provided with a threaded flange 38, and a cylindrical cage 39 having openings 39' therein surrounds the thermostat and has one end threaded onto the flange 38 and the other end formed with an inwardly extending flange 40 fitting over the fluted portion 29 and slidably arranged thereon and adapted to fit against the valve seats 25 and 30 to close the port opening 12.

A connector pipe 41 is secured to the outer face of the cover 21 as by bolts 42.

In Fig. 1 of the drawings the thermostatic unit 31 is shown in the form of a plaited tube containing an expansible liquid or gas and is in its normal or contracted position. It will be noticed that in this position the flanged end 40 of the cage 39 abuts the valve seats 25 and 30 thereby effectually closing the port opening 12 and preventing the flow of water therethrough, and the plate 36 leaves the opening 13 clear. As the thermostat expands it moves the flange 40 from the valve seats 25 and 30 and moves the valve plate 36 toward and finally against the valve seat 16 thus opening the port 12 and effectually closing the port 13.

It will be noticed that in any position of the cage 39 the water passing through the chamber will pass through the openings 39' directly into contact with the thermostat unit and when the port 12 is partly or wholly open the circulation of water around the unit is assisted by the grooves in the fluted portion 29 of the member 26.

Figure 3:
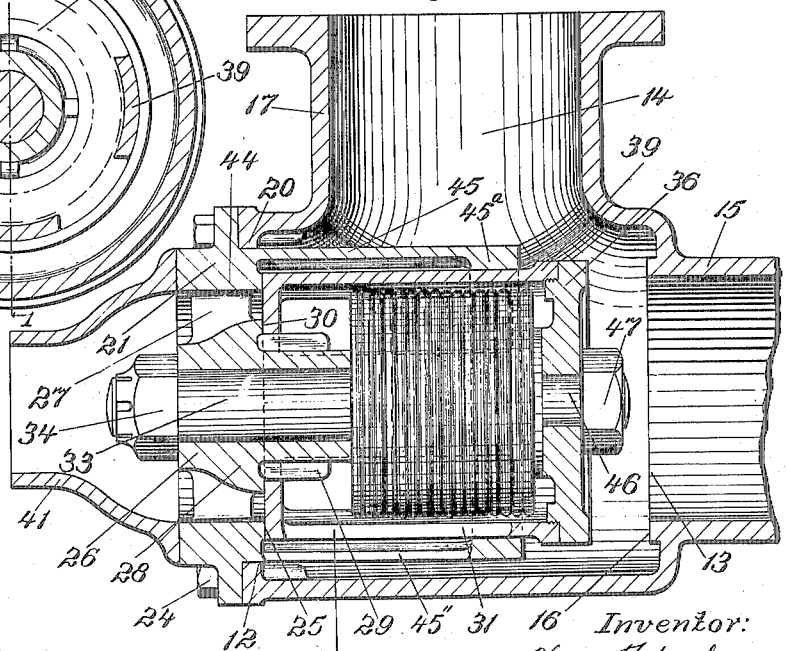
Fig. 3 is similar to Fig. 1 but showing another form of valve support.

Referring to the form of invention illustrated in Fig. 3 practically the only difference in construction is the manner of supporting the cage and thermostat.

There is a cover 44 similar to the cover 21 except that it is provided with a cylindrical cage extension 45 projecting into the valve chamber. This extension 45 has openings 45″ and a ring bearing 45ᵃ formed by its inner end and the cage 39 is slidably arranged therein and partly supported thereby.

It will be seen that in Fig. 3 the thermostatic unit is not provided with a stem 32 and the member 15 has no bearing member formed therein. In this figure however, the unit 31 has a stud 46 fitting through the valve part 36 and the latter is retained in place by a nut 47 threaded onto the stud. The unit is wholly supported by the cover 44.

Various modifications of the invention may be made without departing from the spirit or scope of the invention.

Having thus described my invention, what I claim and desire to secure by Letters Patent is:—

1. A valve device comprising a casing having spaced oppositely facing valve seats, a valve arranged between said seats, and a thermostat arranged between said seats and adapted to move said valve from one seat to the other.

2. A valve device comprising a casing having spaced oppositely facing valve seats, and an outlet intermediate said seats, a valve arranged between said seats and adapted to close against either seat and a thermostat in said valve adapted to move said valve between said seats.

3. A valve device comprising a casing having two inlet ports and an outlet port, a valve adapted to close either inlet port, and a thermostat mounted between said inlet ports and expanding toward one of them and away from the other for operating said valve.

4. A valve device comprising a casing having two inlet ports and an outlet port, a sliding valve adapted to close either inlet port, and a thermostat arranged wholly within the valve for operating the same.

5. A valve device comprising a casing having two inlet ports and an outlet port, a cage having a valve part at either end adapted to control said inlet ports, and a thermostat in said cage for moving said valve parts to control said inlet ports.

6. A valve device comprising a casing having oppositely disposed valve seats, a double faced valve arranged between and adapted to coöperate with said seats, and a thermostat expanding toward one of them and away from the other arranged in said valve for moving it.

7. A valve device comprising a casing having oppositely disposed valve seats, a double faced valve arranged between and adapted to coöperate with said seats, and a thermostat in said valve secured at one end to the casing and adapted to move the valve from one seat to the other.

8. A valve device comprising a casing having oppositely disposed valve seats, a double faced valve arranged to slide from one of said seats to the other, and a thermostat arranged in said valve for moving it.

9. A valve device comprising a casing having oppositely disposed valve seats, a double faced valve having sliding engagement with said casing at each end and adapted to coöperate with said seats and a thermostat arranged wholly within said valve for moving it.

10. A valve device comprising a casing having oppositely disposed valve seats forming valve abutments and having a valve supporting part adjacent each seat, a valve supported in said parts and adapted to coöperate with and abut against said seats, and a thermostat arranged in said valve for moving it.

11. A valve device comprising a casing having a valve seat and an opening opposite the valve seat, a hollow cover for said opening having a valve seat thereon, a valve adapted to coöperate with said valve seats, and a thermostat secured to said cover and adapted to operate said valve.

12. A valve device comprising a casing having a valve seat and an opening opposite the valve seat, a hollow cover for said opening having a valve seat thereon, said cover having a boss extending into the casing, a valve mounted to slide on said boss and coöperate with said valve seats, and a thermostat secured to said cover and adapted to operate said valve.

13. A valve device comprising a casing having a valve seat and an opening opposite the valve seat, a hollow cover for said opening having a valve seat thereon, said cover having a boss extending into the casing, a valve mounted to slide on said boss and coöperate with said valve seats, and a thermostat in said valve and secured at one end to said cover and adapted to operate said valve.

14. A valve device comprising a casing having a valve seat and an opening opposite the valve seat, a hollow cover for said opening having a valve seat thereon, said cover having a boss extending into the casing, a valve mounted to slide on said boss and coöperate with said valve seats, and a thermostat for operating said valve.

15. A valve device comprising a casing having a valve seat at either end and a side outlet opening, a valve cage having valve parts adapted to coöperate with said valve seats, said cage being slidingly supported in the casing at both ends adjacent said seats and a thermostat in said cage connected to the cage at one end and to the casing at the other end.

16. A valve device comprising a casing having a valve seat at either end and a side outlet opening, and said casing having a support adjacent each valve seat, a valve cage having valve parts adapted to coöperate with said valve seats, said cage having sliding engagement with said supports, and a thermostat in said cage connected to the cage at one end and to one of the supports at the other end.

17. A valve device comprising a casing having a valve seat at either end and a side outlet opening, and said casing having a support adjacent each valve seat, a valve cage having valve parts adapted to coöperate with said valve seats, said cage having sliding engagement with said supports, and a thermostat in said cage connected to the cage at one end and having a part passing through and connected to one of said supports at the other end.

In testimony whereof I affix my signature.

HARRY T. WOOLSON.